(12) United States Patent
Li

(10) Patent No.: US 11,852,159 B2
(45) Date of Patent: Dec. 26, 2023

(54) FAN BODY AND ELECTRONIC APPARATUS

(71) Applicant: Lenovo (Beijing) Limited, Beijing (CN)

(72) Inventor: Ziran Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/552,147

(22) Filed: Dec. 15, 2021

(65) Prior Publication Data

US 2022/0299041 A1 Sep. 22, 2022

(30) Foreign Application Priority Data

Mar. 22, 2021 (CN) .......................... 202110303353.9

(51) Int. Cl.
 *F04D 29/34* (2006.01)
 *F04D 29/38* (2006.01)

(52) U.S. Cl.
 CPC ............. *F04D 29/34* (2013.01); *F04D 29/38* (2013.01)

(58) Field of Classification Search
 CPC .......... F04D 29/34; F04D 29/38; F04D 29/30; F04D 29/668; F04D 29/282; F04D 29/281; F04D 29/666; Y02D 10/00
 See application file for complete search history.

(56) References Cited

U.S. PATENT DOCUMENTS

| | | | |
|---|---|---|---|
| 7,192,254 B2 * | 3/2007 | Li | F04D 29/282 |
| | | | 415/199.1 |
| 7,918,651 B2 * | 4/2011 | Jiang | F04D 29/282 |
| | | | 415/178 |
| 10,422,350 B2 * | 9/2019 | Herrou | F04D 29/282 |
| 11,365,747 B2 * | 6/2022 | Chan | F04D 25/0613 |
| 11,401,943 B2 * | 8/2022 | Horng | F04D 29/325 |
| 2007/0140836 A1 * | 6/2007 | Chao | F04D 29/282 |
| | | | 415/119 |
| 2013/0309077 A1 * | 11/2013 | Su | F04D 29/668 |
| | | | 415/203 |
| 2021/0033102 A1 * | 2/2021 | Sung | A45D 20/12 |

FOREIGN PATENT DOCUMENTS

| | | | | |
|---|---|---|---|---|
| CN | 1982726 A | * | 6/2007 | |
| CN | 1982726 A | | 6/2007 | |
| CN | 107448415 A | * | 12/2017 | ............ F04D 29/26 |
| CN | 111396371 A | * | 7/2020 | ............ F04D 29/26 |
| CN | 108488099 B | * | 12/2020 | .......... F04D 29/281 |
| CN | 112460065 A | * | 3/2021 | .......... F04D 29/281 |
| WO | WO-2021060838 A1 | * | 4/2021 | ............. F04D 25/08 |

OTHER PUBLICATIONS

CN1982726_Translation—Jun. 2007—Ruiting.*

* cited by examiner

*Primary Examiner* — Jesse S Bogue
(74) *Attorney, Agent, or Firm* — ANOVA LAW GROUP, PLLC

(57) ABSTRACT

A fan body includes a fixture, a first fan blade set, and a second fan blade set. The fixture is located at a middle of the fan body and configured to be connected to a power mechanism that drives the fan body to rotate. A first fan blade of the first fan blade set is connected to the fixture. A second fan blade of the second fan blade set is connected to neighboring first fan blades of the first fan blade set.

18 Claims, 3 Drawing Sheets

FAN BODY AND ELECTRONIC APPARATUS

CROSS-REFERENCE TO RELATED APPLICATION

This application claims priority to Chinese Patent Application No. 202110303353.9, filed on Mar. 22, 2021, the entire content of which is incorporated herein by reference.

TECHNICAL FIELD

The present disclosure generally relates to a fan body and an electronic apparatus.

BACKGROUND

A fan structure is a commonly used structure by people. Currently, fan blades may be easily damaged, which impacts the service life of the fan body.

SUMMARY

Embodiments of the present disclosure provide a fan body, including a fixture, a first fan blade set, and a second fan blade set. The fixture is located at a middle of the fan body and configured to be connected to a power mechanism that drives the fan body to rotate. A first fan blade of the first fan blade set is connected to the fixture. A second fan blade of the second fan blade set is connected to neighboring first fan blades of the first fan blade set.

Embodiments of the present disclosure provide an electronic apparatus, including a fan body. The fan body includes a fixture, a first fan blade set, and a second fan blade set. The fixture is located at a middle of the fan body and configured to be connected to a power mechanism that drives the fan body to rotate. A first fan blade of the first fan blade set is connected to the fixture. A second fan blade of the second fan blade set is connected to neighboring first fan blades of the first fan blade set.

In embodiments of the present disclosure, the fan body includes the fixture located in the middle of the fan body and configured to be connected to the power mechanism that drives the fan body to rotate. The fan body further includes the first fan blade group and the second fan blade group. The first fan blade of the first fan blade set is fixedly connected to the fixture. The second fan blade of the second fan blade set is connected to the neighboring first fan blades of the first fan blade set. The second fan blade may improve the strength of the first fan blade to prevent the first fan blade from being damaged. At the same time, the second fan blade may reduce the vibration generated by the first fan blade during the rotation of the fan body, thereby reducing the noise of the rotation of the fan body. In addition, the air volume of the fan body may be increased by the second fan blade with the same noise and speed.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

REFERENCE NUMERALS

Figure 1:
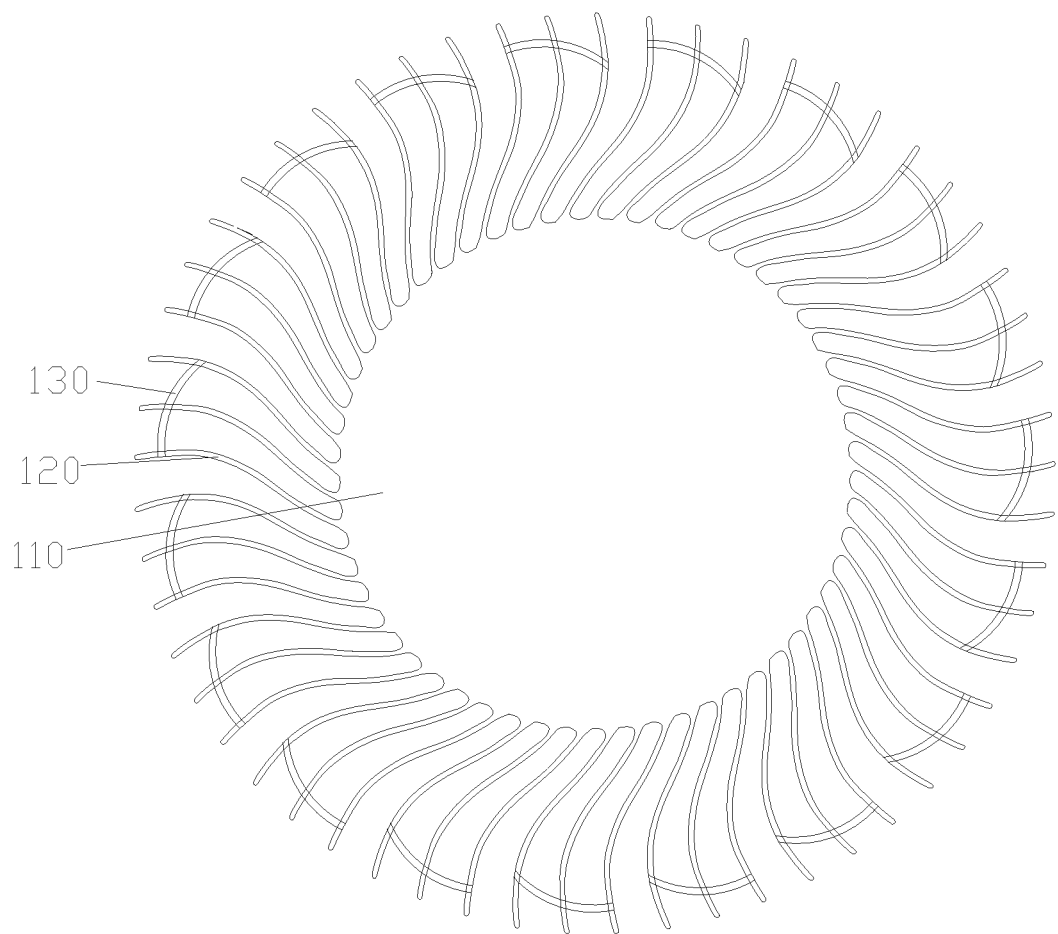
FIG. 1 illustrates a schematic structural diagram of a fan body according to some embodiments of the present disclosure.

110—Fixture, 120—First fan blade, 130—Second fan blade, 140—connector.

DETAILED DESCRIPTION OF THE EMBODIMENTS

The technical solution of the present disclosure is further described in detail in connection with the accompanying drawings and embodiments of the present disclosure.

The present disclosure is further described in detail below in conjunction with the accompanying drawings and specific embodiments. Specific embodiments described here are only used to explain the present disclosure and are not used to limit the present disclosure.

In the description of embodiments of the present disclosure, unless otherwise specified and limited, the term "connection" should be understood in a broad sense. For example, the term may include an electrical connection, a communication inside two components, a direct connection, or an indirect connection through an intermediate medium. Those of ordinary skill in the art can understand specific meanings of the above term according to specific situations.

The term "first\second\third" involved in embodiments of the present disclosure may be only used to distinguish similar objects and may not represent a specific order for objects. "first\second\third" may be interchanged in specific order or sequence when allowed. The objects distinguished by "first\second\third" may be interchanged under appropriate situations so that embodiments of the present disclosure described here may be implemented in an order other than those illustrated or described here.

A fan body described in embodiments of the present disclosure is described in detail below with reference to FIGS. 1 to 3.

The fan body includes a fixture 110, a first fan blade set, and a second fan blade set. The fixture 110 is located in the middle of the fan body. The fixture 110 is configured to be connected to a power mechanism, which drives the fan body to rotate. A first fan blade 120 of the first fan blade set may be fixedly connected to the fixture 110. A second fan blade 130 of the second fan blade set may be connected to neighboring first fan blades 120 of the first fan blade set. The strength of the first fan blade 120 may be improved through the second fan blade 130 to prevent the first fan blade 120 from being damaged. Meanwhile, the second fan blade 130 may reduce the vibration generated by the first fan blade 120 during a rotation of the fan body. Thus, the noise of the rotation of the fan body may be reduced. In addition, with the same noise and the same rotation speed, the air volume of the fan body may be increased through the second fan blade 130.

In embodiments of the present disclosure, a structure of the fixture 110 may not be limited. For example, the fixture 110 may have a plate-shaped structure. For another example, the fixture 110 may have a shell-shaped structure.

A cross-sectional shape of the fixture 110 may not be limited. For example, as shown in FIGS. 1 to 3, a cross-section of the fixture 110 may have a circular shape.

In some embodiments, the power mechanism, which drives the fan body to rotate may include a motor.

In embodiments of the present disclosure, a number of the first fan blades 120 of the first fan blade set may not be limited. The first fan blades 120 of the first fan blade set may be arranged at intervals along a circumferential direction of the fixture 110. Distances between neighboring first fan blades 120 of the first fan blade set may be same or different.

In some embodiments, a shape of a first fan blade 120 may not be limited. For example, the first fan blade 120 may have a plate-shaped structure. For another example, the first fan blade 120 may also have a curved plate-shaped structure.

In some embodiments, a method of implementing the fixed connection between the first fan blade 120 and the fixture 110 may not be limited. For example, the first fan blade 120 and the fixture 110 may be fixedly connected by adhesive glue. For another example, the first fan blade 120 and the fixture 110 may be different members of a same injection molded piece. The first fan blade 120 and the fixture 110 may be formed into an integral structure through injection molding.

In embodiments of the present disclosure, the second fan blade 130 may be configured to propel the air to flow. The second fan blade 130 may be further configured to connect the neighboring first fan blades 120 to improve the strength of the first fan blades 120.

In some embodiments, a number of second fan blades 130 of the second fan blade set may not be limited. The second fan blades 130 of the second fan blade set may be arranged at intervals along the circumferential direction of the fixture 110. Distances between neighboring second fan blades 130 of the second fan blade set may be same or different.

In some embodiments, a shape of the second fan blade 130 may not be limited. For example, the second fan blade 130 may have a plate-shaped structure. For another example, the second fan blade 130 may also have a curved plate-shaped structure.

In some embodiments, a method of implementing the connection between the second fan blade 130 with the neighboring first fan blades 120 of the first fan blade set may not be limited. For example, the second fan blade 130 may be fixedly connected to the neighboring first fan blades 120 of the first fan blade set through the adhesive glue. For another example, the second fan blade 130 and the neighboring first fan blades 120 of the first fan blade set may be different members of the same injection-molded piece. The second fan blade 130 and the neighboring first fan blades 120 of the first fan blade set may be formed into the integral structure by injection molding.

In some embodiments, a connection position of the second fan blade 130 and the first fan blade 120 may not be limited. For example, a portion of the second fan blade 130 may be inserted into the first fan blade 120. For another example, the portion of the second fan blade 130 may also be attached to one side of the first fan blade 120.

In some embodiments, an air outlet angle of the second fan blade 130 and an air outlet angle of the first fan blade 120 may be the same or different.

The fan body of the present disclosure may include a centrifugal fan body.

As an example, as shown in FIG. 1, the air outlet angle of the second fan blade 130 is different from the air outlet angle of the first fan blade 120. Air outlet directions and air outlet surface of the fan body may be increased by outputting air through the fan blades with different air outlet angles.

Figure 2:
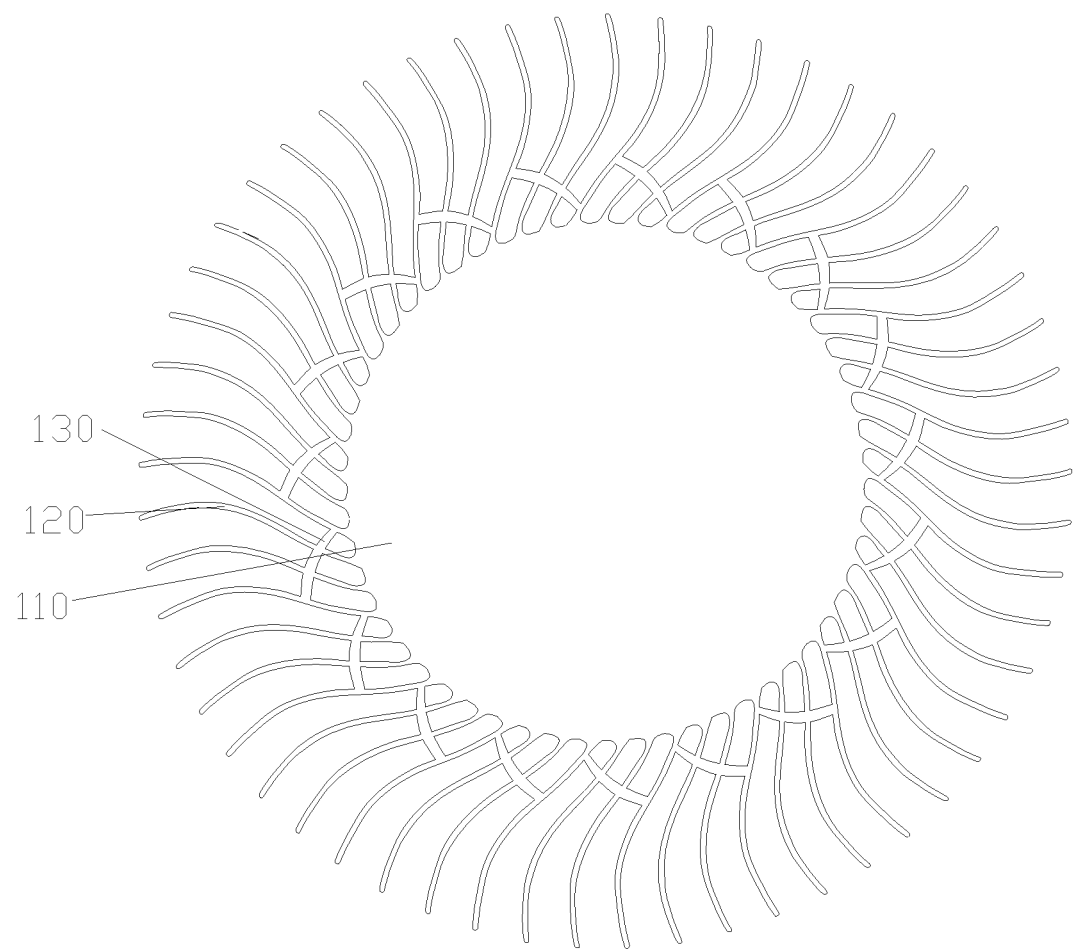
FIG. 2 illustrates a schematic structural diagram of a fan body according to some embodiments of the present disclosure.

In some embodiments, as shown in FIG. 2, the air outlet angle of the first fan blade 120 may be greater than a first determined angle, and the air outlet angle of the second fan blade 130 may be smaller than the first determined angle.

In some embodiments, the value of the first determined angle may not be limited. For example, the value of the first determined angle may range from 60° to 100°. As an example, the first determined angle may include 90°.

In some embodiments, the second fan blade 130 may be connected to the fixture 110. The fixture 110 may support the second fan blade 130. The second fan blade 130 may be connected to the neighboring first fan blades 120 of the first fan blade set. As such, the supporting strength of the second fan blade 130 for the adjacent first fan blade 120 of the first fan blade set may be improved through the fixture 110.

The second fan blade 130 may also have a gap from the fixture 110. That is, the second fan blade 130 may not be connected to the fixture 110. For example, as shown in FIG. 1, the second fan blade 130 is connected to the ends of the neighboring first fan blades 120. Thus, the second fan blade 130 may improve the strength of the end of the first fan blade 120. For another example, as shown in FIG. 2, the second fan blade 130 is connected to the roots of the neighboring first fan blades 120. Thus, the second fan blade 130 may improve the strength of the root of the first fan blade 120.

In some embodiments, a number of first fan blades 120 connected to a second fan blade 130 may not be limited. For example, the second fan blade 130 may be connected to at least two first fan blades 120 to improve the strength of the neighboring first fan blades 120. As an example, as shown in FIGS. 1 and 2, one second fan blade 130 is connected to three first fan blades 120.

In some embodiments, a number of second fan blades 130 connected to a first fan blade 120 may not be limited. For example, the first fan blade 120 may be connected to at least one of the second fan blades 130 so that the strength of each of the first fan blades 120 may be improved by the second fan blade 130. As an example, as shown in FIG. 1, the number of the second fan blade 130 connected to one first fan blade 120 is one. As another example, as shown in FIG. 2, the number of second fan blades 130 connected to some first fan blades 120 is one, and the number of second fan blades 130 connected to some other first fan blades 120 is two.

In some embodiments, as shown in FIGS. 1 and 2, a diameter of the first fan blade 120 may be greater than a diameter of the second fan blade 130 so that the first fan blade 120 is mainly configured to guide airflow. The second fan blade 130 may be configured to guide the airflow and enhance the strength of the first fan blade 120.

The diameter of the second fan blade 130 may refer to a diameter of a circle formed by the end of the second fan blades 130 of the second fan blade set. The diameter of the first fan blade 120 may refer to a diameter of a circle formed by the end of the first fan blade 120 of the first fan blade set.

In some embodiments, the number of the first fan blades 120 and the number of the second fan blades 130 may not be limited. For example, as shown in FIGS. 1 and 2, the number of the first fan blades 120 may be greater than the number of the second fan blades 130. The number of the first fan blades 120 may also be smaller than or equal to the number of the second fan blades 130.

Figure 3:
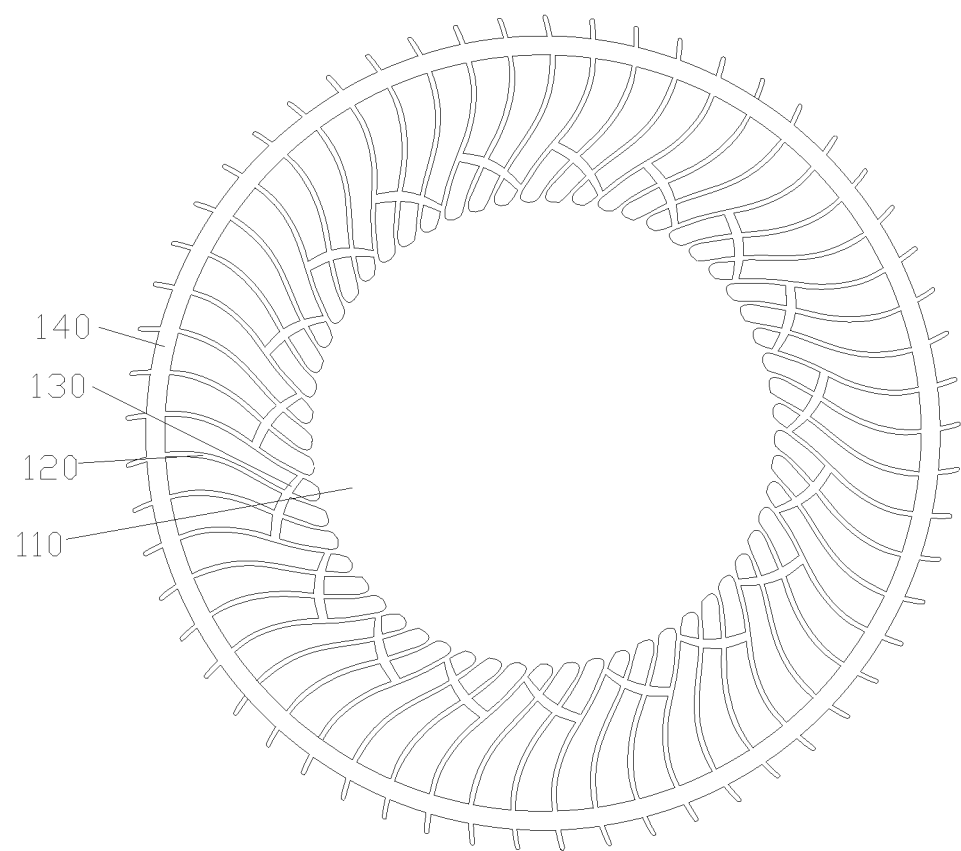
FIG. 3 illustrates a schematic structural diagram of a fan body according to some other embodiments of the present disclosure.

In some embodiments of the present disclosure, as shown in FIG. 3, the fan body further includes a connector 140. The connector 140 is arranged with the fixture 110 at an interval.

The connector 140 is connected to at least two first blades 120 in the first fan blade set. The connector 140 may be configured to increase the strength of the first fan blades 120.

In embodiments of the present disclosure, a structure of the connector 140 may not be limited.

For example, as shown in FIG. 3, the connector 140 is in a closed shape. The connector 140 is arranged at a peripheral side of the fixture 110 so that the connector 140 is connected to each first fan blade 120. Thus, the first fan blades 120 form an integrated structure near the connector 140 to greatly improve the strength of the first fan blades 120.

In some embodiments, the connector 140 may have a ring-shaped structure.

For another example, the fan body may further include at least two connectors 140. The at least two connectors 140 may be arranged in a ring shape along the peripheral side of the fixture 110 such that the strength of the fan blades 120 may be improved through the at least two connectors 140.

In some embodiments, a number of at least two connectors 140 may not be limited.

In some embodiments, a number of the first fan blades 120 connected to each connector 140 may not be limited. For example, each connector 140 may be connected to three first fan blades 120.

In some embodiments, a number of the connectors 140 connected to each first fan blade 120 may not be limited. For example, each first fan blade 120 may be connected to one connector 140. For another example, some first fan blades 120 may be connected to two connectors 140, and some other first fan blades 120 may be connected to one connector 140. For another example, each first fan blade 120 may be connected to two connectors 140.

In embodiments of the present disclosure, as shown in FIG. 3, the second fan blade 130 is connected to the root of the first fan blade 120. The connector 140 is connected to the end of the first fan blade 120. Thus, the strength of the root of the first fan blade 120 may be improved by the second fan blade 130. The strength of the end of the first fan blade 120 may be improved by the connector 140.

The second fan blade 130 may also be connected to the end of the first fan blade 120. The connector 140 may also be connected to the root of the first fan blade 120. Thus, the strength of the end of the first fan blade 120 may be improved by the second fan blade 130. The strength of the root of the first fan blade 120 may be improved by the connector 140.

In some other embodiments of the present disclosure, the fan body may not include the connector 140. Thus, the second fan blade 130 may be configured to connect the first fan blades 120 and also guide the airflow.

In embodiments of the present disclosure, the fan body may include a fixture 110 located in the middle of the fan body and configured to be connected with the power mechanism that drives the fan body to rotate. The fan body may further include a first fan blade set and the second fan blade set. The first fan blade 120 of the first fan blade set may be fixedly connected to the fixture 110. The second fan blade 130 of the second fan blade set may be connected to the neighboring first fan blades 120 of the first fan blade set. The second fan blade 130 may increase the strength of the first fan blade 120 to prevent the first fan blade 120 from being damaged. At the same time, the second fan blade 130 may reduce the vibration generated during the rotation of the first fan blade 120 of the fan body, thereby reducing the noise caused by the rotation of the fan body. In addition, the second fan blade 130 may also increase the air volume of the fan body when the noise and the rotation speed are the same.

Embodiments of the present disclosure also provide an electronic apparatus. The electronic apparatus may include the fan body according to some embodiments of the present disclosure.

In some embodiments, the electronic apparatus may include an electric fan, a computer, or a mobile phone.

The above are only specific embodiments of the present disclosure, but the scope of the present disclosure is not limited to this. Those skilled in the art may easily think of changes or substitutions within the technical scope of the present disclosure. Therefore, the scope of the present invention should be subject to the scope of the claims.

What is claimed is:

1. A fan body, comprising:
a fixture located at a middle of the fan body and configured to be connected to a power mechanism that drives the fan body to rotate;
a first fan blade set, a first fan blade of the first fan blade set being connected to the fixture; and
a second fan blade set comprising a plurality of second fan blades that are not in contact with the fixture at the middle of the fan body, a second fan blade of the second fan blade set being connected to at least three first fan blades of the first fan blade set.

2. The fan body according to claim 1, wherein an air outlet angle of the second fan blade is different from an air outlet angle of the first fan blade.

3. The fan body according to claim 2, wherein:
the air outlet angle of the first fan blade is greater than a first determined angle;
the air outlet angle of the second fan blade is smaller than the first determined angle; and
the first determined angle is 90°.

4. The fan body according to claim 1, wherein:
a length of the first fan blade is greater than a length of the second fan blade; and
a number of the first fan blade is greater than a number of the second fan blade.

5. The fan body according to claim 1, further comprising:
a connector arranged at an interval from the fixture and connected to at least two first blades of the first blade set.

6. The fan body according to claim 5,
wherein the connector has a closed shape and is arranged at a peripheral side of the fixture;
the fan body further comprising:
at least two connectors arranged in a ring shape along the peripheral side of the fixture.

7. The fan body according to claim 5, wherein:
the second fan blade is connected to a root of the first fan blade; and
the connector is connected to an end of the first fan blade.

8. The fan body according to claim 1, wherein:
the first fan blade is connected to at least one of the second fan blades; and
a portion of the second fan blade is inserted into the first fan blade.

9. The fan body according to claim 1, wherein:
each of the second fan blades are disposed to pass through corresponding neighboring first fan blades along a same direction that inclines towards the fixture, the second fan blades are configured to propel an air to flow, and an air outlet angle of the second fan blades and an air outlet angle of the first fan blades are different.

10. The fan body according to claim 1, wherein:
the second fan blade and the at least three first fan blades connected to the second fan blade are different members of a same injection-molded piece.

11. An electronic apparatus comprising a fan body including:
- a fixture located at a middle of the fan body and configured to be connected to a power mechanism that drives the fan body to rotate;
- a first fan blade set, a first fan blade of the first fan blade set being connected to the fixture; and
- a second fan blade set comprising a plurality of second fan blades that are not in contact with the fixture at the middle of the fan body, a second fan blade of the second fan blade set being connected to at least three first fan blades of the first fan blade set.

12. The electronic apparatus according to claim 11, wherein an air outlet angle of the second fan blade is different from an air outlet angle of the first fan blade.

13. The electronic apparatus according to claim 12, wherein:
the air outlet angle of the first fan blade is greater than a first determined angle;
the air outlet angle of the second fan blade is smaller than the first determined angle; and
the first determined angle is 90°.

14. The electronic apparatus according to claim 11, wherein:
a length of the first fan blade is greater than a length of the second fan blade; and
a number of the first fan blade is greater than a number of the second fan blade.

15. The electronic apparatus according to claim 11, further comprising:
a connector arranged at an interval from the fixture and connected to at least two first blades of the first blade set.

16. The electronic apparatus according to claim 15, wherein:
the connector has a closed shape and is arranged at a peripheral side of the fixture; or
the fan body further comprising:
at least two connectors arranged in a ring shape along the peripheral side of the fixture.

17. The electronic apparatus according to claim 15, wherein:
the second fan blade is connected to a root of the first fan blade; and
the connector is connected to an end of the first fan blade.

18. The electronic apparatus according to claim 11, wherein:
the first fan blade is connected to at least one of the second fan blades; and
a portion of the second fan blade is inserted into the first fan blade.

* * * * *